United States Patent [19]

Chaul

[11] Patent Number: 4,962,792
[45] Date of Patent: Oct. 16, 1990

[54] FLUIDS RATE OF FLOW SAVING OR LIMITING DEVICE

[76] Inventor: Cesar F. Chaul, Av. Revolución No. 1579, San Angel 01000, Mexico

[21] Appl. No.: 360,815

[22] Filed: Jun. 2, 1989

[51] Int. Cl.⁵ .............................................. G05D 7/01
[52] U.S. Cl. ...................................... 138/42; 137/504
[58] Field of Search .................. 137/504, 517; 138/45, 138/44, 42

[56] References Cited

U.S. PATENT DOCUMENTS

| | | | |
|---|---|---|---|
| 780,986 | 1/1905 | Francis | 137/504 |
| 3,503,417 | 3/1970 | Toda | 137/504 X |
| 3,805,824 | 4/1974 | Robbins | 137/504 |
| 4,075,294 | 2/1978 | Saito | 137/504 X |
| 4,650,094 | 3/1987 | Werding | 137/504 X |

FOREIGN PATENT DOCUMENTS 240955 1/1960 Australia ............... 137/504

Primary Examiner—Robert G. Nilson
Attorney, Agent, or Firm—Sughrue, Mion, Zinn, MacPeak & Seas

[57] ABSTRACT

The clogging by impurities and the annoying noise caused by the rattling action of the internal parts of a fluids rate of flow saving or limiting device comprising a tubular fitting having an inlet end of larger diameter and an outlet end of smaller diameter with an internal shoulder formed therebetween, and a needle type shutter actuated by a spring concentrically arranged within said tubular fitting, are avoided by the improvement comprising a shutter formed by an upper larger diameter body and a lower smaller diameter body arranged concentrically within said fitting, a circular flange on the upper end of said upper body, a shoulder between said upper and lower bodies, said shoulder comprising a plurality of downwardly extending projections, at least one surface groove extending longitudinally of said upper body to permit free non-clogging passage of the fluid, and a soft material washer sandwiched between a pair of rigid washers supported on the internal shoulder of said fitting, said soft washer projecting inwardly of said rigid washers, whereby when vibration of the shutter is produced by the fluid, said shutter will strike against said soft washer thus avoiding the noise produced by the rattling of the device.

4 Claims, 1 Drawing Sheet

FLUIDS RATE OF FLOW SAVING OR LIMITING DEVICE

FIELD OF THE INVENTION

This invention refers to needle type fluid saving devices and is more particularly related to a device for saving fluids by limiting the rate of flow thereof, which is not easily clogged and is of quiet operation.

BACKGROUND OF THE INVENTION

Devices for saving or limiting the rate of fluids flow such as water are well known in the art. Said devices particularly comprise a connecting tube which is provided with an inlet portion having internal threads and with an outlet portion having external threads, the portion corresponding to the external threads being of a smaller diameter than the remainder of the body of the connecting tube, said connecting tube being provided with a helical spring of a shape and a strength suitable to allow the desired rate of flow and arranged within said tube, and a specially designed needle-type shutter, particularly of a stepped cylindrical shape, concentrically arranged within said spring such that at the inlet end of the shutter, there is formed a flange, on the internal part of which bears the spring surrounding the needle type shutter, said spring bearing at its lower portion on an internal shoulder formed in the connecting tube by a reduction of the diameter of the same.

The above mentioned flange arranged on the upper end of the needle type shutter, is provided with one or a plurality of axially extending holes for allowing the fluid flow to pass. During the operation of the prior art fluid rate of flow limiting devices, the vibration of the shutter due to passage of the fluid, produces a rattling effect on the body ends of the needle type shutter against the internal wall of the connecting tube and produces a noise level which is regarded as being of a high degree of annoyance. On the other hand, the holes provided for the passage of the fluid, are rapidly clogged and even completely obstructed in a relatively short period of time, particularly when the fluid is impure water. The above defects cause significant inconveniences because of the annoying noise of said prior art devices and because of the cumbersome and costly operation of frequently disassembling said connecting tubes in order to clean the fluid flow holes of the shutter.

OBJECTS OF THE INVENTION

Considering the disadvantages of the fluids rate of flow saving or limiting devices of the prior art, it is an object of the present invention, to provide a rate of flow saving or limiting device which is of quiet operation; and An additional object of the present invention is to provide a fluids rate of flow saving or limiting device, of the above mentioned character, which is not easily clogged by the impurities transported by the fluids.

BRIEF DESCRIPTION OF THE DRAWINGS

The novel aspects regarded as characteristic of the present invention, will be established particularly in the appended claims. However, the invention itself, both as to its organization and its method of operation, together with additional objects and advantages thereof, will be best understood in the following detailed description of certain specific embodiments, when read in connection with the accompanying drawings, wherein:

DETAILED DESCRIPTION OF THE INVENTION

Figure 1:
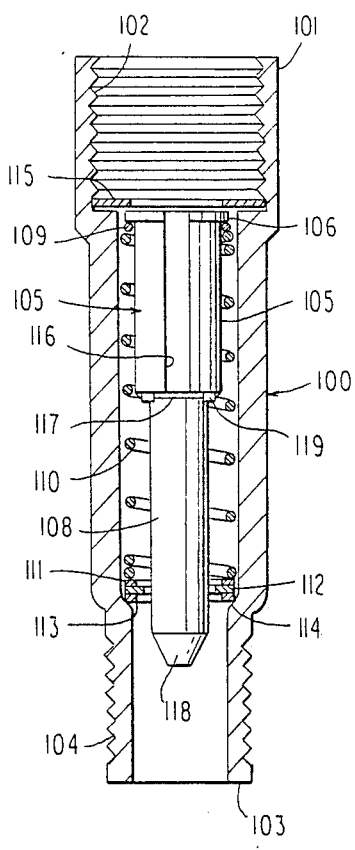
FIG. 1 is a longitudinal cross-sectional view of a device for saving or limiting the rate of flow of fluids, built in accordance with the present invention, and showing the improvements in the same.

Referring to FIG. 1 of the drawings, there is illustrated a fluids rate of flow saver or limiting device built according to the present invention, which is of a quiet operation, which is not clogged easily by the impurities in the fluids, and does not block the passage of fluids when used in high pressure systems, and which comprises a connecting tube or fitting 100 provided with an inlet end 101 having a larger diameter than the fitting and with internal threads as shown in 102, and an outlet end 103 provided with external threads as shown in 104, this end 103 being of a diameter smaller than that of the remainder of the fitting body. In the interior of the body of the fitting 100 there is a stepped, cylindrical, needle type shutter 105, comprising in its upper part or inlet side of the fitting, a circumferencial flange 106, followed by an upper elongated cylindrical body 107 having a diameter smaller than that of the upper flange 106, and a lower or needle body portion 108 having a diameter smaller than that of the upper body 107, and a length larger than that of the said upper body 107, and being provided with a lower needle shaped end 118.

Around the upper end of the cylindrical body portion 107, and bearing on the lower surface of the flange 106, an O-ring 109 having an outer diameter slightly larger than that of the flange 106 is provided. Below said Oring 109, and directly bearing on the lower surface thereof, a spring 110 concentrically surrounding the needle type shutter 105 is also provided. Said spring 110 is of a shape and a strength suitable to allow compression thereof under the fluid pressure, and to recover its original position when the fluid pressure is removed, and is firmly supported at its other end on a washer assembly comprising a first rigid washer 111, followed downwardly by a washer 112 of soft material such as an elastomeric or plastic material, having an internal diameter smaller than that of said washer 111 and sandwiched between said first washer and a second washer 113 of rigid material, identical with said first washer 111. This assembly of washers 111, 112 and 113, is firmly supported on a shoulder 114, internally formed in the fitting 100 by a reduction of the diameter thereof.

The rigid washers 111 and 113 sandwiching said soft washer 112, prevent the latter from being carried away by high pressure flow into the outlet end 103 thus causing the blocking of said fitting.

At the upper end of the needle type shutter 105, there is arranged a washer of soft material, of the elastomeric or plastic type, generally designated with the reference numeral 115, acting as a stop or stroke limiter for the shutter 105 at the inlet side of the fitting 100.

In the cylindrical body portion 107 of this shutter 105, one or more longitudinally extending surface grooves 116 are formed, through which grooves the fluid passes without the risk of easily clogging such grooves with the impurities or sediments of the fluids, such as in hard waters.

A circumferencial tapering or chamfer is formed in the step 117 constituted by the reduction in diameters between the body portion 107 and the body portion or needle 108 of the shutter 105, and on said tapering or chamfer 117, several projections 119 of short length are provided, so that when the shutter body portion 107 rests on the washer 111, pushed by the passage of high pressure fluid, a plurality of slots will be formed for allowing the passage of fluid, because said projections 119 will not penetrate into the washer Ill, made of hard material.

The shutter of the present invention, functions in such a way as to avoid the annoying noise of the prior art shutters and, besides, is not easily clogged because the surface grooves 116 formed around the body portion 107, provide a better fluid passage than the usual holes or orifices. When a fluid passes through the fitting 100, said fluid enters through the inlet end 101, and then passes through the longitudinal surface grooves 116 formed on the cylindrical body portion 107 of the shutter 105, and pushes the shutter 105 towards the outlet end 103 of said fitting 100, in such a way that the needle-shaped end 118 of the needle body 108 passes through the inside of the washers 111, 112 and 113, because of the compression suffered by the spring 110 due to the fluid pressure. The motion of the fluid produces vibrations in the needle body 108, such that the O-ring 109 and the needle-shaped end 118, strike laterally, respectively, against the inner wall of the fitting 100 and against the interior of the washer 112, which is of an internal diameter less than that of the washers 111 and 113, thus dampening the noise, because said O-ring 109 and said washer 112 are made of a soft material of the elastomeric or plastic type.

On the other hand, when the fluids flow is cut or reduced so that the pressure exerted on the spring 110 decreases, this spring pushes the shutter lOS actuating on the flange 106 so that the upper part of said flange 106 hits against the washer 115, the noise of such action being dampened because the washer 115 is manufactured from a relatively soft material of the plastic or elastomeric type.

Furthermore, when a high pressure fluid passes through the fitting 100, the spring is compressed to an extent sufficient to bring the projections 119 formed on the step 117 of the shutter 105 to abut against the washer 111 which is a hard washer that does not allow such projections 119 to penetrate the same, whereby a plurality of slots remain between each pair of the projections 119, for allowing the free passage of the fluid.

Finally, when said high pressure fluid is flowing the washers 111 and 113 behave as retainers for the washer 112,sandwiching it between them, so that said soft washer 112 is prevented from being carried away to the internal portion of the outlet end 103, thus avoiding the blocking of said outlet by said washer 112.

Even though preferred embodiments of the present invention have been described for illustration purposes, those skilled in the art, will appreciate that many additions, modifications as well as substitutions are possible without departing from the spirit and scope of the present invention, as defined in the accompanying claims.

I claim:

1. In a fluids rate of flow saving or limiting device comprising a tubular fitting having an inlet end and an outlet end, said inlet end having a larger diameter than said tubular fitting and said outlet end having a smaller diameter than said tubular fitting to form a first shoulder between said inlet end and said tubular fitting and a second shoulder between said tubular fitting and said outlet end, a needle type shutter comprising an upper cylindrical body having a radially outwardly extending flange on the top thereof and a lower cylindrical body having a needle shaped end at the bottom thereof, said lower cylindrical body being of a diameter smaller than said upper cylindrical body to form a third shoulder therebetween, and a spring having its upper end bearing against said flange of the shutter and its lower end bearing on a washer assembly supported by said second shoulder, the improvement which comprises at least one surface groove longitudinally provided on the surface of said upper cylindrical body of the shutter and extending the full length thereof to provide a free non-clogging passage for the fluid from said inlet end through said shutter to said outlet end of the fitting, said washer assembly supported on said second shoulder comprising a soft washer sandwiched between a pair of rigid washers, said soft washer projecting radially inwardly of said rigid washers to a distance sufficient to dampen a rattling action of said shutter against the inner walls of said fitting, and a plurality of projections on said third shoulder adapted to about against the corresponding one of said rigid washers when the shutter is pushed by high pressure fluid downwardly through the washer assembly, so as to provide a corresponding plurality of slots between each pair of said projections for allowing the passage of said fluid therethrough at a restricted flow rate.

2. In a fluids rate of flow saving or limiting device according to claim 1 wherein said inlet end is provided with innerthreads, a pipe is threadably engaged within said inlet end and a soft washer is inserted between the end of said pipe and said first shoulder in order to dampen the strike of said flange on the upward stroke of said shutter.

3. In a fluids rate of flow saving or limiting device according to claim 2 wherein an O-ring of soft material is inserted between the upper end of said spring and the lower face of said flange, in order to dampen the strike of said spring against said flange.

4. In a fluids rate of flow saving or limiting device according to claim 3 wherein said spring is a helical spring arranged concentrically between said shutter and the inner wall of said tubular fitting, said spring having an elasticity sufficient to permit the spring to decrease its length when the shutter is pushed by high pressure fluid and to recover its length when said pressure fluid ceases to act on said shutter, in order to close or open the shutter in proportion with the pressure of said fluid.

* * * * *